C. E. ALLEN.
NUT LOCK.
APPLICATION FILED FEB. 9, 1921.
1,390,007.
Patented Sept. 6, 1921.
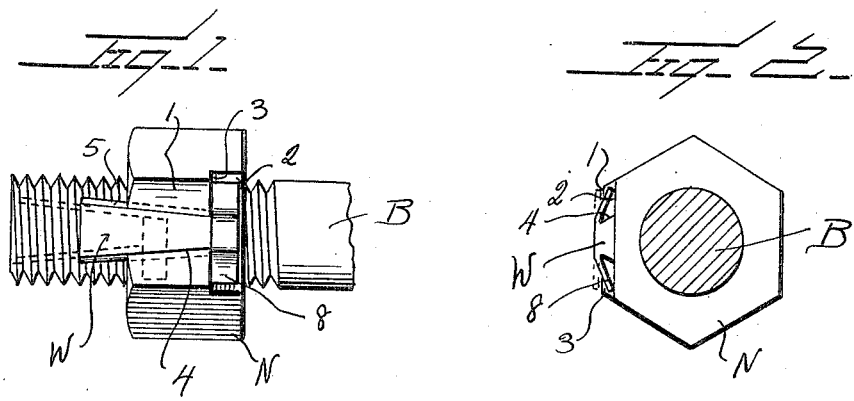
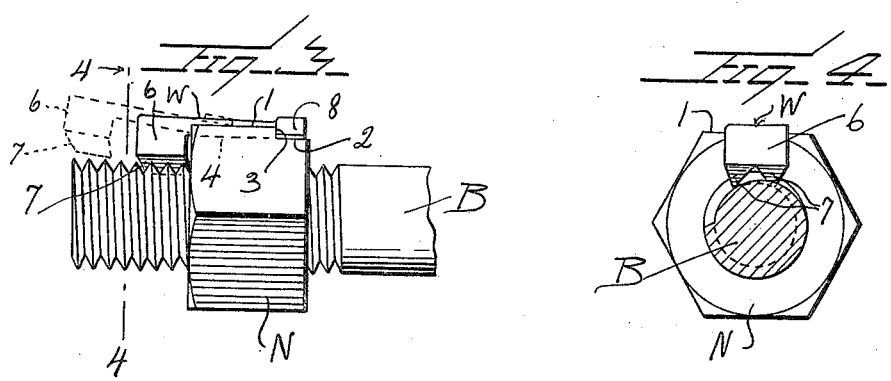
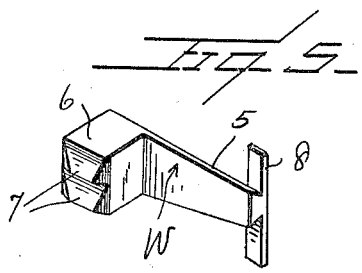
Inventor
C. E. Allen
By Watson E. Coleman
Attorney

UNITED STATES PATENT OFFICE.

CHARLES EHGER ALLEN, OF WILLIAMSON, PENNSYLVANIA.

NUT-LOCK.

1,390,007.  Specification of Letters Patent.  Patented Sept. 6, 1921.

Application filed February 9, 1921. Serial No. 443,580.

*To all whom it may concern:*

Be it known that I, CHARLES E. ALLEN, a citizen of the United States, residing at Williamson, in the county of Franklin and State of Pennsylvania, have invented certain new and useful Improvements in Nut-Locks, of which the following is a specification, reference being had to the accompanying drawings.

This invention relates to certain improvements in nut locks, and has relation more particularly to a device of this general character and of a coupled nut and bolt type, and it is an object of the invention to provide a novel and improved nut lock embodying a wedge member engageable with a nut and having biting action upon the bolt whereby the nut is effectively held against rotation with respect to the bolt.

Another object of the invention is to provide a novel and improved nut lock embodying a member engageable with the nut and provided with means for biting the threads of the bolt whereby the nut is effectively held against retrograde movement with respect to the bolt together with means for holding the member against displacement with respect to the nut.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will be hereinafter definitely claimed.

In order that my invention may be the better understood, I will now proceed to describe the same with reference to the accompanying drawings, wherein, Figure 1 is a view in elevation of a nut lock constructed in accordance with the embodiment of my invention and in applied position, a second position of the wedge member being indicated by dotted lines;

Fig. 2 is a view in rear elevation of the structure illustrated in Fig. 1;

Fig. 3 is an elevational view of my improved device as herein disclosed, said elevation being substantially at right angles to Fig. 1, a second position of the wedge member being indicated by dotted lines;

Fig. 4 is a sectional view taken substantially on the line 4—4 of Fig. 3; and

Fig. 5 is a view in perspective of the wedge member unapplied.

As disclosed in the accompanying drawings, B denotes a bolt upon which is threaded a nut N. A facet 1 of the nut N and adjacent the inner face of the nut has disposed transversely thereacross a rabbet 2 which provides a shoulder 3 for a purpose to be hereinafter more particularly referred to.

The facet 1 at substantially its transverse center is provided with a longitudinally directed groove or channel 4 open at the outer face of the nut N and also in communication with the rabbet 2. The groove or channel 4 tapers toward the rabbet 2 and the side walls of said groove or channel 4 are undercut as is clearly illustrated in Fig. 2 of the drawings.

W denotes a wedge member engageable within the groove or channel 4 through the outer or larger end of said groove or channel and the side marginal positions of said member W are beveled as indicated at 5 in Fig. 5 to underlie the undercut portions of the side walls of the groove or channel 4.

The outer or wide end of the member W is provided with an inwardly directed head or block 6, the inner face of which being provided with the teeth 7. Each of the teeth 7 is provided with a relatively long cutting or biting edge which extends in a direction lengthwise of the bolt B when the nut N is applied, said working edge 8 of the tooth being of a length to bite or impinge a plurality of adjacent convolutions of the thread of a bolt so that the nut N will be effectively held by the applied member W against rotation, and particularly retrograde rotation, with respect to the bolt B.

The smaller end of the wedge member W is provided with a laterally directed arm or wing 8, which when the member W is being inserted within the groove or channel 4, rides over the facet 1 and assumes a position above the rabbet 2. By a suitable impact on the arm or wing 8 by a hammer or other tool the said arm or wing 8 will be flexed, as illustrated in Fig. 2, into the rabbet 2 for coaction with the shoulder 3 so that the wedge member W is effectively held against outward movement with respect to the nut N.

As is indicated by dotted lines in Fig. 3 it is to be understood that when the smaller end of the wedge member is initially applied within the groove or channel 4 said wedge member will be angularly disposed with respect to the bolt B so that the wedge member W may be inserted a considerable distance within the groove or channel 4 before a blow is imposed upon the outer or larger end of the member W to cause the teeth 7 to properly bite or impinge the thread of the bolt B. This assures an effective assembly of the nut lock without undue resistance being offered to the desired application of the wedge member W by the head or block 6 thereof. It will also be understood that the wedge member W will have free entry movement within the outer or larger end of the groove or channel 4 as determined by the angle of convergence of the side walls of the groove or channel 4 and the longitudinal or end margins of the member W.

From the foregoing description it is thought to be obvious that a nut lock constructed in accordance with an embodiment of my invention is particularly well adapted for use by reason of the convenience and facility with which it may be employed, and it will also be obvious that my invention is susceptible to some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. In combination with a nut having a tapered groove in its outer face disposed in the same general direction as the bore of the nut and having a rabbet in said face in angular relation to the groove, said rabbet providing a shoulder, a wedge member insertible within the groove and provided at one end with a head to engage the shank to which the nut is applied, the opposite end portion of the wedge member being provided with an extension to co-act with the shoulder to hold the wedge member against outward movement when applied within the groove.

2. In combination with a nut having a tapered groove in its outer face disposed in the same general direction as the bore of the nut and having a rabbet in said face in angular relation to the groove, said rabbet providing a shoulder, a wedge member insertible within the groove and provided at one end with a head to engage the shank to which the nut is applied, the opposite end portion of the wedge member being provided with an extension to co-act with the shoulder to hold the wedge member against outward movement when applied within the groove, said extension being bendable and riding over the face of the nut when the wedge member is moving within the groove.

3. In combination with a nut having a tapered groove in its outer face disposed in the same general direction as the bore of the nut and having a rabbet in said face in angular relation to the groove, said rabbet providing a shoulder, a wedge member insertible within the groove and provided at one end with a head to engage the shank to which the nut is applied, the opposite end portion of the wedge member being provided with an extension to co-act with the shoulder to hold the wedge member against outward movement when applied within the groove, the side walls of the groove and wedge member overlapping.

4. In combination with a nut having a tapered groove in its outer face disposed in the same general direction as the bore of the nut, a wedge member insertible within the groove and provided with an inwardly directed block at its outer end, said block being provided with a tooth adapted to impinge the shank upon which the nut is applied.

5. In combination with a nut having a tapered groove in its outer face disposed in the same general direction as the bore of the nut, a wedge member insertible within the groove and provided with an inwardly directed block at its outer end, said block being provided with a tooth adapted to impinge the shank upon which the nut is applied, said wedge member being provided with means to hold the same, when applied, against outward movement.

6. In combination with a nut having a tapered groove in its outer face disposed in the same general direction as the bore of the nut, a wedge member insertible within the groove and provided with an inwardly directed block at its outer end, said block being provided with a tooth adapted to impinge the shank upon which the nut is applied, said wedge member and nut being provided with co-acting means to hold the wedge member, when applied, against outward movement.

7. In combination with a nut having a tapered groove in its outer face disposed in the same general direction as the bore of the nut, a wedge member insertible within the groove and provided with an inwardly directed block at its outer end, said block being provided with a tooth adapted to impinge the shank upon which the nut is applied, the cutting edge of the tooth being elongated and disposed in a direction lengthwise of the wedge member.

8. In combination with a nut having a groove in its outer face, a member insertible within the groove, co-acting means carried by the member and a nut for holding the member, when applied, against displacement, an inwardly directed block carried by the member and provided with a tooth to impinge the shank upon which the nut is applied.

In testimony whereof I hereunto affix my signature.

CHARLES EHGER ALLEN.